United States Patent

Gusmano

[11] Patent Number: 5,157,500
[45] Date of Patent: Oct. 20, 1992

[54] AMPLIFIER-RETURN-DRIVEN CCD OFFSET CONTROL FOR SCANNING ARRAYS

[75] Inventor: Donald J. Gusmano, Henrietta, N.Y.

[73] Assignee: Xerox Corporation, Stamford, Conn.

[21] Appl. No.: 767,454

[22] Filed: Sep. 30, 1991

[51] Int. Cl.⁵ .............................................. H04N 5/335
[52] U.S. Cl. .......................... 358/213.15; 358/213.11; 358/213.26
[58] Field of Search ....................... 358/213.15, 213.16, 358/213.17, 213.26, 221, 162, 163, 461, 446, 171, 213.11; 330/59; 250/214 A

[56] References Cited

U.S. PATENT DOCUMENTS

| | | | |
|---|---|---|---|
| 4,216,503 | 8/1980 | Wiggins | 358/280 |
| 4,314,281 | 2/1982 | Wiggins et al. | 358/280 |
| 4,602,291 | 7/1986 | Temes | 358/221 |
| 4,639,781 | 1/1987 | Rucci et al. | 358/163 |
| 4,660,082 | 4/1987 | Tomohisa et al. | 358/163 |
| 4,698,685 | 10/1987 | Beaverson | 358/213.15 |
| 4,907,084 | 3/1990 | Nagafusa | 358/171 |
| 4,920,428 | 4/1980 | Lin et al. | 358/461 |

FOREIGN PATENT DOCUMENTS 57-104368 6/1982 Japan.
59-123374 7/1984 Japan.
2-149068 6/1990 Japan.

Primary Examiner—Herbert Goldstein
Assistant Examiner—Tuan V. Ho
Attorney, Agent, or Firm—R. Hutter

[57] ABSTRACT

In an image scanning device having a scanning array with a plurality of photosites detecting light from an image, the signals from the photosites being output from the scanning array through an amplifier in a sequence having reset pulses between the analog signals for each photosite, an apparatus maintains the reset pulses at a constant offset voltage. A peak follower holds the maximum value of voltage from each cycle of the sequence as the offset voltage, and outputs a constant voltage related to the offset voltage. An amplifier return driver accepts the constant voltage from the peak follower, and maintains the potential between the signal input to the amplifier and the return of the amplifier at a constant value.

5 Claims, 3 Drawing Sheets

AMPLIFIER-RETURN-DRIVEN CCD OFFSET CONTROL FOR SCANNING ARRAYS

FIELD OF THE INVENTION

The present invention relates to an apparatus for controlling the voltage level of the video offset in analog image data from an electronic scanning array.

BACKGROUND OF THE INVENTION

In electronic input scanners for document scanning, image information is acquired by sensing light from an image at an array of photosites arranged across a path of relative movement of the array and the image. The photosites, typically photodiodes or amorphous silicon sensors, are formed on a semiconductor substrate or chip, with one or more chips butted or otherwise arranged closely together to form the array. The photosite array may provide a 1:1 correspondence of photosites to the width of the actual image (a full width array), or may rely on optics to reduce the apparent image size to correspond to a smaller array. In use, each photosite produces an output signal related to the light intensity detected at the photosite.

The array of photosites is typically incorporated into what is known as a "charge-coupled device," or CCD. The CCD accumulates the signals from individual photosites in the array forming one scan line on the image. After the signals making one scan line are collected, the signals are loaded in parallel fashion to a shift register which typically forms part of the CCD. As each scan line of the image is scanned, the signals in the shift register are shifted out of the CCD in a linear fashion. Thus, the CCD accepts as an input the a set of light intensities within each scan line through an image, such as of a document to be copied, and produces as an output a time-varying linear signal corresponding to the various light and dark values within each scan line. This output is sent ultimately to a digital-to-analog converter, which converts the entire image into a quantity of digital data.

FIG. 1 shows a typical waveform which is output by a CCD. In this graph, voltage is shown as a function of time. The waveform is a sequence of varying voltage levels, each corresponding to one photosite in the scan line. The different levels are separated by reset pulses R of a regular frequency, which ideally are short pulses of a constant voltage. In a typical configuration of a CCD output, the value of the voltage level for each photosite varies according to the light level into the photosite: the brighter the input from the image to that particular photosite, the greater the difference between the output level and the voltage value of the reset pulses. The voltage level of the reset pulse is a fixed value from the value of the dark video (a condition in which no light is going into the photosite, as in a black area of an image). Because the difference in voltage values between the reset and the dark video is fairly constant, it can serve as an important reference with respect to the video.

In a typical application, the output of a CCD is a 100 to 400 mV signal on top of an offset ranging from 3 volts to 8 volts. It is significant that the offset voltage from various CCDs will vary widely among various types of CCDs and even among CCDs of the same type. Because of this variance in the voltage level of the offset, numerous prior art devices have attempted to normalize this offset so that the CCD waveform can be properly processed before being fed into a digital-to-analog converter. This normalization is crucial because the circuitry that will process the analog video requires a fixed, known offset in order to properly distinguish black video from white video.

A common technique for ensuring the proper normalization of signals from the CCD to the analog-to-digital converter is to employ an external source of DC between the CCD and the analog-to-digital converter so that the voltage of the offset may be adjusted accordingly. However, a common problem that occurs when such an external DC source is used is a drift in the voltage offset over a period of use. Such a drift will have conspicuous results in the quality of documents printed with the scanner. In the example waveform shown in FIG. 1, if the voltage of the reset pulses is equivalent to black and lower voltage levels correspond to relatively "lighter" parts of the image, a slow downward drift in the voltage offset will cause areas on the printed document to appear gray when they should be black, and generally lighten a document made from the scanned image. Further, when the drift occurs in the course of use, documents made according to the CCD output will show an unevenness in quality. If the drift is apparent within a single scan line, a copy made from the scanned image will be noticeably lighter towards one edge of the scan line. It is therefore an important concern in this art that the voltage level of the offset, which serves as a reference voltage for the system, be maintained at a constant value.

In the prior art, there have been numerous proposals for maintaining a constant voltage offset. U.S. Pat. No. 4,698,685 to Beaverson shows an arrangement which provides a gain correction for each pixel in an array. Gain values are stored for each pixel in an electronic storage device. As data is acquired by the array and directed to an image processor, each incoming pixel value is multiplied by a selected gain correction value to produce a gain corrected output. U.S. Pat. No. 4,639,781 to Rucci et al. shows that distortions in a video signal may be corrected by applying a continuous gain adjustment to the video information generated at the pixels and dynamically changing the gain factors on a line by line basis. U.S. Pat. No. 4,660,082 to Tomoshisa et al., teaches that calibration and shading correction of image data may be corrected in synchronism with input scanning by comparison to a density reference value. U.S. Pat. No. 4,216,503 to Wiggins shows deriving offset and gain values from the sensor, storing those values and subsequently using those values for signal correction. U.S. Pat. No. 4,314,281 to Wiggins et al. teaches providing a compensation signal compensating for variations in light to which the sensors are subjected and deriving the compensation signal over a group of pixels, by taking an average response from the group as the group is exposed to a test pattern. U.S. Pat. No. 4,602,291 to Temes teaches a multimode pixel correction scheme which includes correction for pixel offset and gain. U.S. Pat. No. 4,920,428 to Lin et al. teaches the use of an attribute value in conjunction with a gain or offset correction to determine a shift of the correction values, thereby increasing the effective range of correction. Although the above inventions each carry out their respective objects, all of them require relatively extensive ancillary elements in addition to the basic elements for CCD scanning, such as means for providing reference values, means for accumulating and averaging signal values, means for multiplying signals by a gain correction value, etc. The above inventions all address the problem of calibration; that is, they address the problem that, for a given light input, two pixels may produce different outputs. The above inventions all have the effect of performing mathematical manipulations on the analog data to achieve a desired result.

Of particular relevance to the present application is Japanese patent abstract 57-104368, which describes a circuit for correcting drift in a video signal. During the blanking period of the video signal (i.e., between the outputs of each scan line), a drift component is detected and fed back to a DC amplifier. One drawback of this invention is that, because the drift correction cycle occurs only after each scan of a line (as opposed to after the signal from each photosite), drift in the offset can still occur, with a noticeable effect on document quality, within each scan line. Japanese patent abstract 59-123374 describes a system for controlling video gain by clamping the input signal and a synchronizing part of the output signal which is amplified to a prescribed level by a variable amplifier. The value of the offset of the video signal is controlled by varying the gain of the variable amplifier-another form of using an external source of DC, in this case to correct drift which may well be caused by the external DC used for normalization. In contrast to these two patents, it is an object of the present invention to maintain the offset voltage of the sequence of CCD signals at a constant, normalized value without resorting to external sources of DC bias, which have been known to cause drift. In other words, the present invention described below circumvents a problem which prior art devices merely compensate for.

It is another object of the present invention to maintain the offset voltage of the sequence of CCD signals at a constant value while requiring only a relatively small number of additional parts.

It is another object of the invention to maintain the offset voltage of the sequence of CCD signals at a constant value by means of providing a control system which operates through the power return of an amplifier accepting the analog data in sequence.

Other objects will appear hereinafter.

SUMMARY OF THE INVENTION

In accordance with the above objects, the present invention is an apparatus for maintaining the offset voltage of the reset pulses at a constant value, in an image scanning device having a scanning array with a plurality of photosites detecting light from an image, each photosite producing an analog voltage signal indicative of light intensity, the signals from the photosites being output from the scanning array in a sequence having reset pulses between the analog signals, the sequence being transmitted from the scanning array to an analog-to-digital converter through an amplifier having a power input, a power return, a signal input, and a signal output. A peak follower holds the maximum value of voltage from the sequence as the offset voltage, and outputs a constant voltage related to the offset voltage. An amplifier return driver accepts the constant voltage from the peak follower, and maintains the potential between the signal input to the amplifier and the return of the amplifier at a constant value.

BRIEF DESCRIPTION OF THE DRAWINGS

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 2:
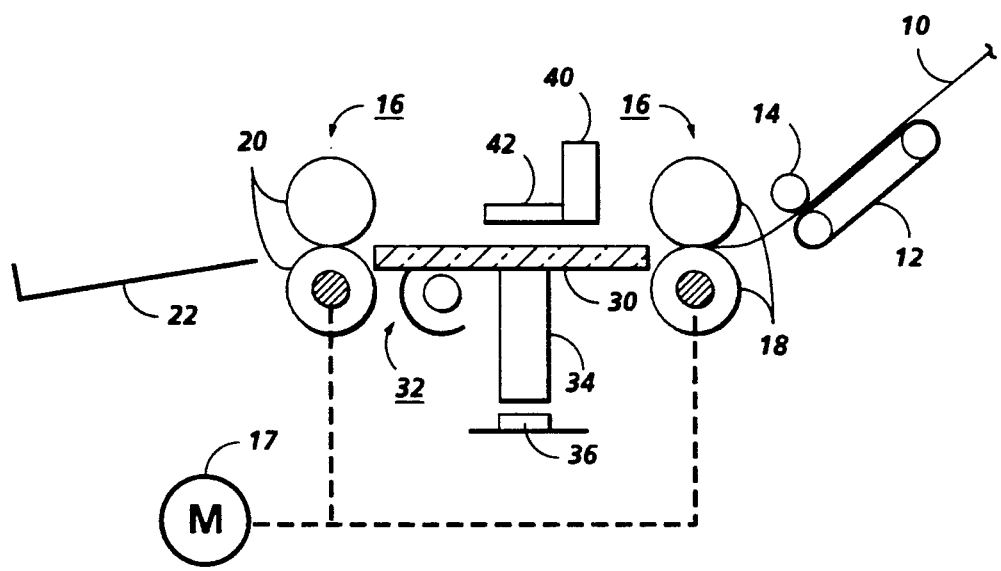
FIG. 2 is a partially schematic diagram of an image scanner which may incorporate the present invention.

FIG. 2 shows one possible embodiment of a line by line image scanning device. Input tray 10 supports documents for feeding to an image position, via center retard belt feeder 12 and corresponding nip roll 14. Documents to be scanned are directed to a constant velocity transport 16, driven by a motor 17 drivingly connected thereto via pulley drives (not shown), for transports of sheets across a scanning position. Documents are initially engaged by transport 16 at a first set of rolls 18, which drive the sheet across an imaging position to a second set of rolls 20, which engage the documents until they are ejected into an output tray 22.

An imaging position is defined by an imaging platen 30, which supports documents during the imaging process, an illuminator 32 typically comprising a lamp and reflector, a SELFOC lens 34 (SELFOC is a trademark of the Nippon Glass Co., for its fiber array lens), which directs light from illuminator 32 reflected from a document being scanned to a photosite array which forms part of a CCD 36. A start of scan detector (or registration detector) 40 signals the system when a lead edge of a document is entering the imaging position, and a white calibration strip 42 is provided at a position for imaging by the photosite array of CCD 36, when a document is not interposed between the the sensor array and calibration strip 42.

Figure 1:
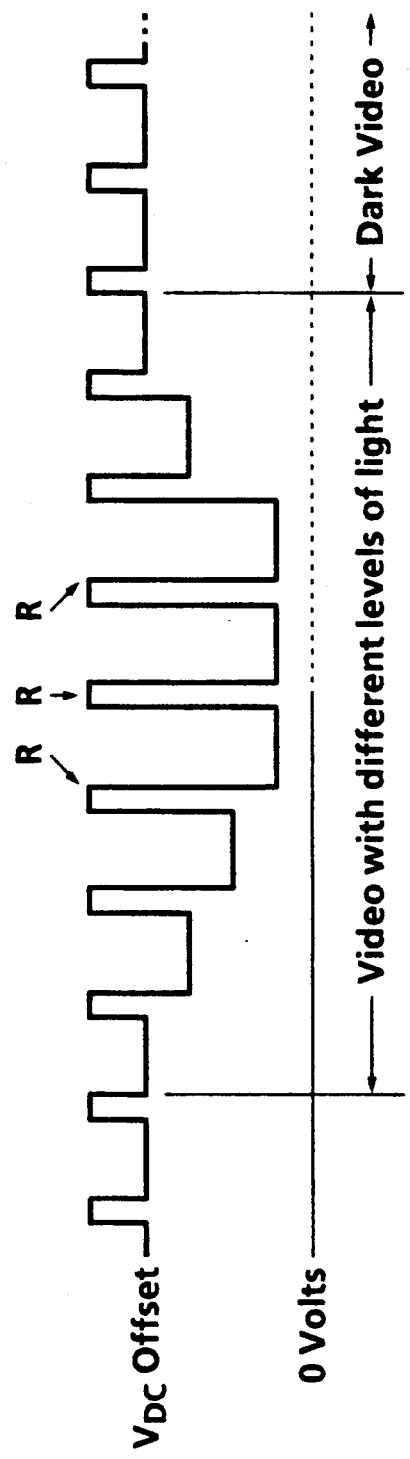
FIG. 1 shows a typical output of a type of CCD commonly known in the prior art.
Figure 3:
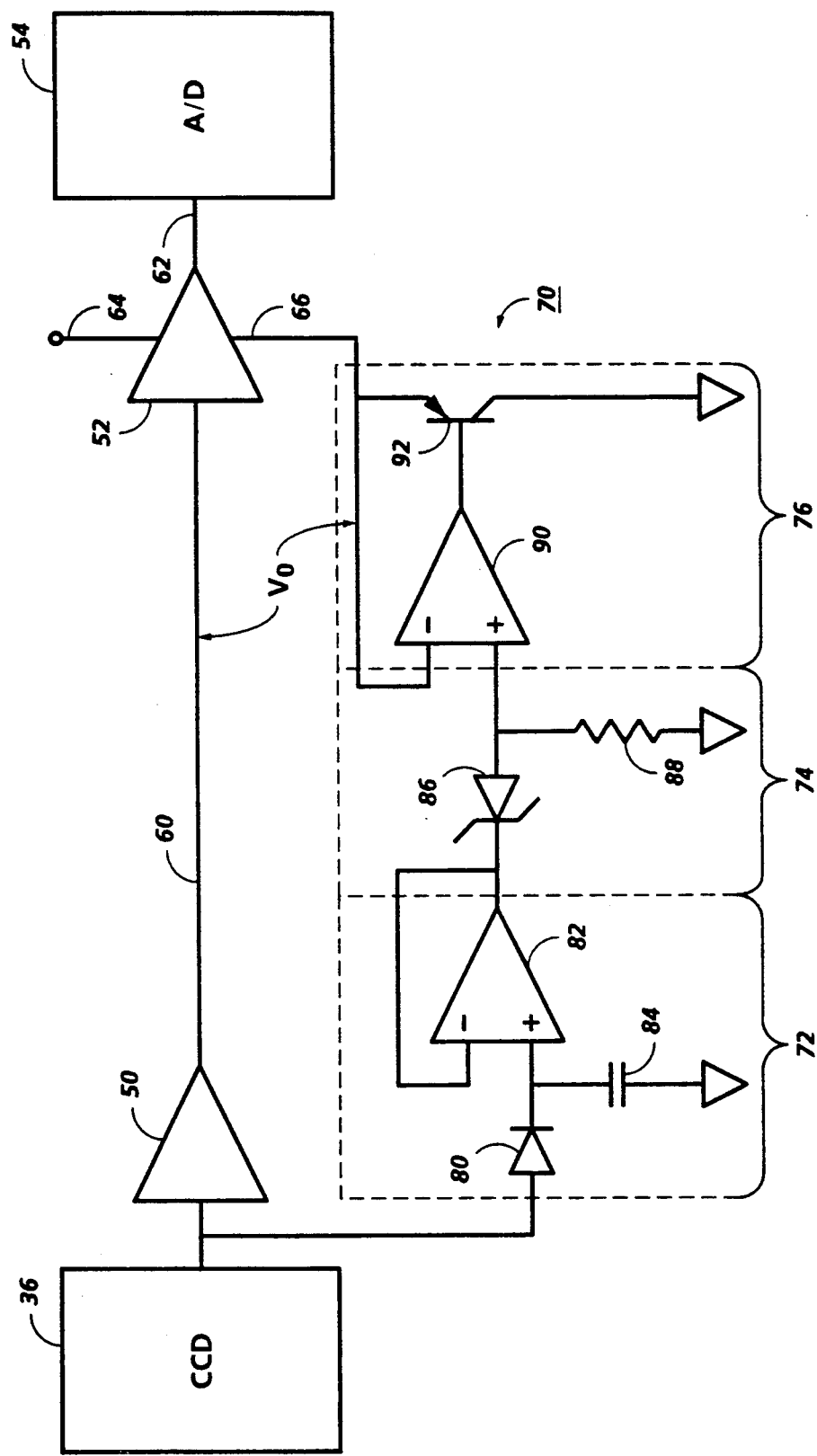
FIG. 3 is a schematic diagram showing the present invention incorporated in a circuit operatively disposed between a CCD and an analog-to-digital converter.

FIG. 3 illustrates an interface between a CCD and an analog-to-digital converter in a scanning system incorporating the present invention. CCD 36, which was generally illustrated in FIG. 2, outputs a linear serial stream of analog data in a waveform like that shown in FIG. 1. The data first enters a buffer 50, which may be in the form of an amplifier with unitary gain. The data is then sent to an amplifier 52, which outputs the data to the analog-to-digital converter 54. In practice there is typically further circuitry between amplifier 52 and analog-to-digital converter 54, but this specific circuitry is generally not crucial to the function of the invention described herein. Analog-to-digital converter 54 outputs a stream of digital data, for subsequent processing in the system.

In prior art devices, a common means for generally normalizing the voltage level of the offset between the CCD 36 and the analog-to-digital converter 54 has been to provide a capacitor in series, along with a DC bias circuit, between buffer 50 and amplifier 52, generally providing an external source of DC. For short-term applications, such an arrangement is satisfactory for normalizing the output from CCD 36 so that it may properly be accepted by analog-to-digital converter 54. However, the presence of such a capacitor in the series between the CCD 36 and analog-to-digital converter 54 will, over the long term, cause a drift in the DC offset as the charge in the capacitor leaks off over time.

Instead of providing a capacitor with a DC bias circuit, the present invention provides a means for sampling the voltage level of the reset pulse with every pixel coming out of the CCD 36, and maintaining that offset voltage by means of a feedback control to maintain the constancy of the voltage level between the signal input 60 of amplifier 52 and the return 66 of amplifier 52. If the relative potential between the signal input 60 and the return 66 of amplifier 52 is held constant, the output from signal output 62 of amplifier 52 will be maintained at a constant, drift-free level, for input into the analog-to-digital converter 54. The exact value of this constant, drift-free level of the voltage can be predetermined by proper selection of the parameters of the circuit (e.g., the gain of amplifier 52) to be suitable for the particular analog-to-digital converter 54.

The circuitry of the present invention is shown in FIG. 3 generally within the box marked 70. The circuitry in box 70 can generally be described as a reset-sampling, amplifier-return-driven voltage control sink. In the preferred embodiment, the voltage control sink 70 comprises three main elements: a peak follower 72, a bias shift 74, and a driver 76. The input into the peak follower 72 is the raw data out of CCD 36, which is branched off in parallel to the main line of data going into buffer 50. The function of peak follower 72 is to sample the linear data stream out of CCD 36, and output a voltage equal to, or at least related to, the highest voltage level within each cycle. Returning for the moment to FIG. 1, it can be seen that the reset pulses between each photosite signal in the data stream define distinct regular cycles in the data stream, the peak of each cycle being the reset pulse itself. By sampling and holding the highest voltage level with each cycle, the peak follower 72 maintains and outputs the voltage level of the offset. In the preferred analog embodiment shown in FIG. 3, peak follower 72 generally comprises a diode 80 feeding into the positive input of an op-amp 82, which is wired for negative feedback as shown. A capacitor 84 is preferably included as well. The combination of diode 80, op-amp 82, and capacitor 84 serve to sample and hold the highest value of voltage within each cycle.

The constant voltage output from peak follower 72 is then passed through a bias shift 74, which generally comprises a zener diode 86 in series, with a parallel resistance 88 to ground. The function of this bias shift 74 is to reduce the voltage signal from peak follower 72 so that it may be input to driver 76. This voltage reduction is necessary for balancing of voltages between the driver 76 and the amplifier 52, as will become apparent below, and ultimately so that the signal output from amplifier 52 is suitable for the particular analog video processing circuitry.

Driver 76 accepts as an input the voltage from peak follower 72 through bias shift 74, and produces as an output a voltage at return 66 of amplifier 52. Once again, the function of driver 76, and of voltage sink 70 in general, is to maintain a constant voltage the signal input 60 into amplifier 52 and the return 66 to amplifier 52.

In the preferred embodiment, driver 76 includes a difference amplifier 90 which outputs into the base of a transistor 92. The positive input into difference amplifier 90 is the voltage output from bias shift 74, and the negative input into difference amplifier 90 is fed back from the return 66 of amplifier 52. The amplifier return 66 also feeds back to the transistor 92. The output of amplifier 90 supplies a current to the base of transistor 92. This current controls the amount of current going from amplifier 52 return to ground, thus producing a voltage drop from the emitter to collector of transistor 92. When there is a difference between the voltage at return 66 of amplifier 52 and the input from bias shift 74, the current from the output of amplifier 90 will change to compensate for the difference. As the current to the base of transistor 92 changes, so will the current flowing from return 66 of amplifier 52 to ground. This will in turn change the voltage drop from amplifier 90 to the collector of transistor 92. It can thus be seen that driver 76 is effectively a feedback loop to maintain the voltage difference $V_0$ between signal input 60 and return 66 at a constant level.

The presence of a voltage at the return 66 of amplifier 52 will effectively control the total power input through amplifier 52 by controlling the net potential between power input 64 and the return 66; a voltage at return 66 is effectively subtracted from the voltage input 64. This control of the net potential through amplifier 52, and the constant potential between the return 66 and signal input 60, serves to maintain the output 62 from amplifier 52 at the desired constant, drift-free level.

Although the preferred embodiment described herein comprises analog elements which have the advantage of simplicity and low cost, it is conceivable that the invention may be embodied in a digital apparatus and/or microprocessor control.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

I claim:

1. In an image scanning device having a scanning array with a plurality of photosites detecting light from an image, each photosite producing an analog voltage signal indicative of light intensity, the signals from the photosites being output from the scanning array in a sequence having reset pulses between the analog signals for each photosite, the sequence being transmitted from the scanning array to an analog-to-digital converter through an amplifier having a power input, a power return, a signal input, and a signal output, an apparatus for maintaining the reset pulses at a predetermined voltage, comprising:

peak follower means for holding the maximum value of voltage from the signals output from the scanning array as the predetermined voltage, and outputting a constant voltage related to the predetermined voltage; and amplifier return driver means, for accepting the constant voltage from the peak follower means, and maintaining the potential between thwe signal input to the amplifier and the power return of the amplifier at a constant value.

2. An apparatus as in claim 1, wherein the peak follower means includes a diode in series with an operational amplifier with negative feedback.

3. In an image scanning device having a scanning array with a plurality of photosites detecting light from an image, each photosite producing an analog voltage signal indicative of light intensity, the signals from the photosites being output from the scanning array in a sequence having reset pulses between the analog signals for each photosite, the sequence being transmitted from the scanning array to an analog-to-digital converter through an amplifier having a plurality of power supply terminals, a signal input, and a signal output, an apparatus for maintaining the reset pules at a predetermined voltage, comprising:

peak follower means for holding the maximum value of voltage from the signals output from the scanning array as the predetermined voltage, and outputting a constant voltage related to the predetermined voltage; and amplifier return driver means, for accepting the constant voltage from the peak follower means, and maintaining the potential between the signal input to the amplifier and one of the plurality of power supply terminals of the amplifier at a constant value, the amplifier return driver means including a difference amplifier having a positive input, a negative input, and an output, and wherein the inputs to the difference amplifier are the constant voltage related to the predetermined voltage and one of the plurality of power supply terminals of the amplifier, and a transistor having a base operatively associated with the output of the difference amplifier, for controlling the current from the amplifier return to ground in response to a difference between the constant voltage related to the predetermined voltage and voltage at one of the plurality of power supply terminals of the amplifier.

4. An apparatus as in claim 1, further comprising a bias shift operatively disposed between the peak follower means and one of the plurality of power supply terminals of the amplifier.

5. An apparatus as in claim 4, wherein the bias shift includes a zener diode.

* * * * *